April 16, 1968 R. S. MOSHER 3,378,028
PRESSURE CONTROL VALVE
Filed March 30, 1965
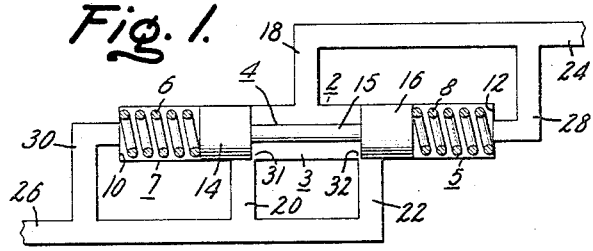
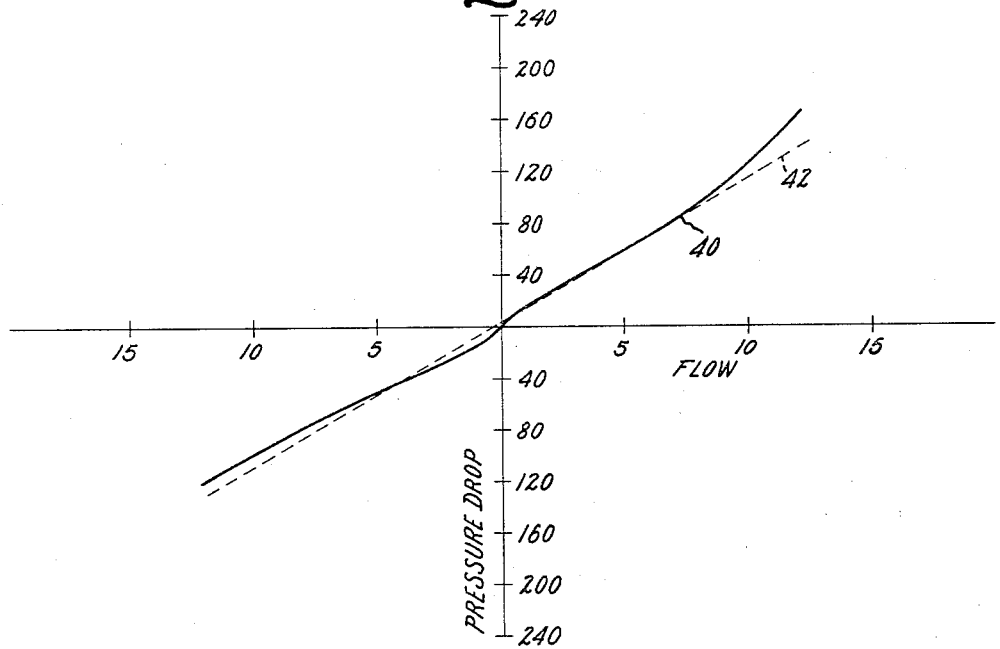
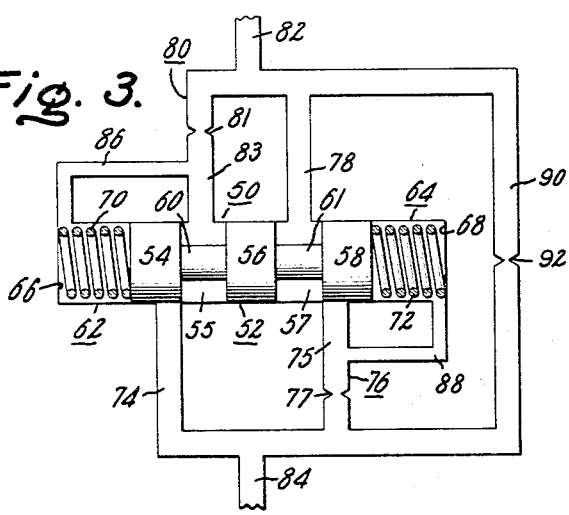
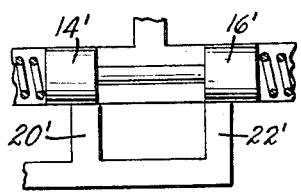
Inventor:
Ralph S. Mosher,
by Paul A. Frank
His Attorney.

United States Patent Office 3,378,028
Patented Apr. 16, 1968

3,378,028
PRESSURE CONTROL VALVE
Ralph S. Mosher, Schenectady, N.Y., assignor to General Electric Company, a corporation of New York
Filed Mar. 30, 1965, Ser. No. 443,836
5 Claims. (Cl. 137—493)

My invention relates to a pressure control valve and, more particularly, to a pressure responsive valve which linearizes the relationship between pressure and flow therethrough to stabilize a system to which it is connected.

In the use of modern hydraulic and hydromechanical equipment, the need to properly control system pressures so that stability is imparted thereto is essential to proper operation of the system and the related equipment. Presently, pressure responsive valves rely only on the input conditions to the valve and completely ignore the output conditions thereof. In other words, as with pressure conditions, when the input pressure is above a certain value, the valve opens, to permit flow therethrough and when the input pressure has dropped to a predetermined level the valve closes, thereby completely disregarding the pressure of the fluid on the output side of the valve. By ignoring the output side pressure, the relationship between pressure drop and flow through the valve is not always linear. Thus, pressure may increase substantially without any appreciable increase in flow and vice versa; a condition which is especially undesirable at low values of pressure and mass flow, since any divergence from a linear relationship between the two has adverse effects on the stability of any system which is controlled by the valve. Electrical stabilizing has been employed but with the decided disadvantage of needing a source of electrical power for the control means when none is needed for the main hydraulic equipment. The need then arises for a pressure equalizing fluid control valve which has a substantially linear relationship between pressure and flow therethrough, especially at the extremes, high and low values, of pressure and flow, so that the valve can control an interrelated system in a stable manner.

The chief object of my invention is an improved fluid operated valve for stabilizing fluid systems.

Another object of my invention is such a valve wherein there is a linear relationship between pressure and flow throughout the entire operating range.

A further object of my invention is such a valve that is feedback responsive.

In carrying out the objects of my invention. I provide a normally closed hydraulic control valve which opens in response to pressure buildup to permit flow therethrough, in a manner wherein the flow to pressure drop ($\Delta P$) relationship is a linear one. When the pressure of the flow through the valve has lessened, a feedback pressure on the opposite side of the valve in combination with spring action closes the valve, while still maintaining this linear flow to pressure drop relationship. Linear response of the valve, a uniform pressure to flow relationship, throughout the entire operating range insures stability of the system, such as a servo system, which the valve controls.

These and other objects of my invention will be more readily perceived from the description which follows.

FIGURE 1 is a schematic view of the valve of my invention.

FIGURE 1a is a schematic view of an alternative valve of my invention.

FIGURE 2 is a graph of the operating characteristics of my valve.

FIGURE 3 is a schematic view of an alternative mode of the valve of FIGURE 1.

In FIGURE 1 there is illustrated the pressure control valve of my invention. The construction includes main passage or chamber 2 in which piston 4 travels. Piston 4 comprises two spools 14 and 16 interconnected by shaft member 15 to form a unitary structure. Bias means, which are preferably springs 6 and 8, situated respectively between end walls 10 and 12 of chamber 2 and the ends of spools 14 and 16, respectively, of piston 4, bias piston 4 towards the center of chamber 2. Extending from mid-section 3 of chamber 2 and communicating therewith are passage members 18, 20 and 22, which may be tubular in construction. The former 18 leads into passage 24 and the latter two 20 and 22 lead into passage 26. Either of the passages 24 and 26 may be employed as in inlet or an outlet, alternatively, to serve as connecting means to reflect information to and from the servo or other system which the valve controls. Bleed passages 28 and 30 tap the flow from passage 24 and 26, respectively, and supply this flow into end chamber 5 and 7, of main chamber 2, through end walls 12 and 10.

In operation, passage 24 is interconnected into a system being controlled such as the input to a servo system and is filled with operating fluid therefrom. Fluid flows through passage 24 to fill passage 18, mid-section 3 of chamber or cylinder 2, bleed passage 28 and end chamber 5 of cylinder 2, containing spring 8. The valve remains in this normally closed state until fluid pressure in passage 24 increases above a predetermined value when the valve begins to function. Fluid pressure in passage 24 is transmitted to chamber 5 so that the pressure therein is now greater than the resistance exerted by the combination of spring 6 and the pressure force within chamber 7 and piston 4 thereby moves towards end wall 10 of chamber 7 (to the left in FIGURE 1). Fluid then travels from tube 24 through tube 18, through mid-section 3 of cylinder 2 and passes through the output side of the valve including tube 20, and passage 26. Bleed passage 30 and chamber 7 also being the feedback elements with flow from passage 24 fill with fluid to thereby transmit the pressure within passage 26 to chamber 7. Flow continues until the fluid pressure in passage 24 has decreased, and at the same time fluid pressure in passage 26 and thereby in chamber 7 has increased to the point where fluid pressure in section 7 in combination with the force exerted by compressed spring 6 is greater than the force exerted by spring 8 in combination with the pressure in chamber 5 to return piston 4 to its central position, as shown in FIGURE 1, in a manner that maintains a linear flow to pressure drop relationship during the entire opening and closing process of the valve.

Alternatively, with flow coming from line 26, the valve actuation is substantially the same as previously described; fluid travels through tube 26 to thereby fill passages 20 and 22 and bleed passage 30. When the pressure within line 26 and thereby the pressure within chamber 7 increases beyond a predesignated amount, the pressure within chamber 7 becomes greater than the combined force exerted by spring 8 in combination with the pressure force in chamber 5 and piston 4 moves toward wall 12 of chamber 2 (to the right in FIGURE 1). This movement slides spool 16 out of its normal position (FIGURE 1), wherein it blocks passageway 20 to permit flow from line 26 to flow through passageway 22 through mid-section 3 of chamber 2, through passageway 18 and out tube 24, to thereby relieve the pressure in tube 26. In the same manner as before, this flow continues through tube 24 until the pressure therein and the pressure within chamber 5 (which is the feedback with flow from 26) increases sufficently so that the increased pressure acting on piston 4 in combination with the force exerted by spring 8, which is under compression, acts on piston 4 to restore it to its steady state position, as shown in FIGURE 1, and thereby properly balance the pressures on both sides of the valve. In the normal position of piston 4 as shown in FIGURE 1, spools 14 and 16 do not completely close tubes 20 and 22, thereby leaving at least one of small passageways 31 and 32 always open to permit some leakage flow through the valve. Pressure communication between tubes 24 and 26 is thereby always maintained, and the linear flow to pressure relationship in the small flow regime (at low values of flow and ΔP) is maintained. Alternatively as shown in FIGURE 1a, spools 14' and 16' may be constructed to completely close passages 20' and 22' if no communication between passages 24 and 26 is desired.

FIGURE 2 graphically illustrates the flow to pressure relationship 40, taken from actual data, that is achieved with the valve of FIGURE 1, and the close relationship thereof with the ideal pressure drop to flow relationship as shown by dotted line 42. Ideally for a stable system, the pressure change should decrease as the flow decreases and vice versa in a linear manner, in other words, in a straight line relationship. As indicated by solid line 40, the relationship between pressure drop, in pounds per square inch, and mass flow, in cubic inches per second, approximates the ideal relationship 42 very closely. Presently, with fluid control valves now in use, the pressures mass flow relationship may have some points where it approximates the ideal curve but they are few and especially nonexistent in the small flow regime (at small volumes of flow and pressure drop) and in the large flow regime (at large values of flow and pressure drop) where linearity of the valve is essential to stability of any system which the valve controls. The upper right-hand quadrant of the graph illustrates flow with passage 24 as the input and the lower left-hand quadrant of the graph illustrates flow with passage 26 as the inlet, thus illustrating that the valve of FIGURE 1 not only achieves linearity but achieves it in either direction of flow therethrough. It is noted that feedback also occurs in either direction of flow with passage 28 and chamber 5 acting as the feedback elements with flow from 26 and passage 30 and chamber 7 acting as the feedback elements with flow from 24.

At times, where flow through the valves is very slight such as when piston 4 is just beginning to move from its normal position or when it is about to complete its return thereto, the pressure drop across the valve is correspondingly decreasing or increasing so that the relationship between the pressure and flow is always a straight line relationship. A relationship such that stability is achieved in the low flow regime, below about 5 in.³/sec. of flow, for the data illustrated. For example, with presently available techniques in this regime, the pressure drop changes slightly from 20 to 0 p.s.i.g. while the volume decreased drastically from 5 to 0 in.³/sec. thereby rendering the system being controlled highly unstable. Similar results happen in the high flow regime, e.g. above 10 in.³/sec., where the pressure drop would increase drastically while the volume would increase slightly due to choking of the flow and thereby the desired linear flow to pressure drop relationship is not produced. My valve by its linear flow to pressure relationship in both high and low flow regimes has completely obviated this instability problem.

In FIGURE 3 there is illustrated an alternative mode of the valve of my invention, whereby linear characteristics as illustrated in FIGURE 2 are also achieved. The construction includes cylinder member 50 having three spooled piston 52 travelling therein. Spools 54, 56 and 58 are interconnected by connecting members 60 and 61 to form a unitary structure and fit closely within cylinder 50 to prevent the leakage of fluid around the spools. Members 60 and 61 are coaxial with the cylindrical spools but are smaller in diameter to permit fluid flow around them. End chambers 62 and 64 are formed by end walls 66 and 68, respectively, of cylinder 50 and spools 54 and 58, and contain springs 70 and 72 therein to bias piston 52 toward the center of cylinder 50, its normal position as shown in FIGURE 3. Connecting into cylinder 50 are passageways 74, 76, 78 and 80, the latter two of which communicate with chambers 55 and 57 of cylinder 50 (which surround connecting members 60 and 61, respectively), and the former two passageways, 74 and 76 are normally closed by spools 54 and 58, respectively. Restriction means 81 and 77, which may be knife edges, are positioned within passages 80 and 76, as will be subsequently described. Passages 78 and 80 interconnect at source passage 82 and passages 74 and 76 interconnect at source passage 84. Bleed passage 86 interconnects passage 80 and chamber 62, and bleed passage 88 connects chamber 64 and passage 76. Bypass 90 containing restriction 92 joins source passage 82 and 84 to complete the system.

In operation, fluid from the system being regulated, such as a servo valve, enters the control valve through either passage 82 or 84, as with the valve of FIGURE 1. As flow enters passage 82 it quickly fills passages 80 and 78, chambers 55 and 57 within cylinder 50 and bleed passage 86 including chamber 62. A small amount of flow also proceeds through passage 90 through restriction 92 and out through passage 84 to provide some flow through the valve at all times. As with flow through openings 31 and 32 of FIGURE 1, flow through passage 90 permits linearity between flow and pressure drop to be maintained even at extremely small values of flow and pressure drop.

Pressure at source passage 82, which is transmitted to chamber 62, increases to the point wherein the pressure in chamber 62 is greater than the resisting force, exerted by the combination of spring 72 and the pressure within chamber 64 to move piston 52 toward wall 68 (to the right in FIGURE 3) against this force. Movement of piston 52 moves spool 58 which is integrally connected thereto to the right (in FIGURE 3) to open passage 76 and permit flow to travel from source passage 82 through passage 78 into chamber 57, through passage 76, including restriction 77, and out source passage 84. Flow continues until the pressure in passage 84 which is transmitted through upper portion 75 of passage 76, above restriction 77, to bleed passage 88 and into chamber 64, reaches a value which when combined with the force of spring 72 is slightly greater than the resistance exerted by the force of pressure in chamber 62 and the force of spring 79 to thereby move piston 52 toward chamber 62 (to the left in FIGURE 3) and thereby linearly reduce the pressure to flow relationship through the valve. Piston 52 continues its movement toward chamber 62 until it returns to the normal position, as shown in FIGURE 3, wherein passage 75 is closed by spool 58 to prevent all flow through the valve, except flow through passage 90, as aforementioned. Restriction 77 in line 76 causes the pressure in section 75 of passage 76 to be slightly higher than the pressure within passage 84, and thereby increases the pressure within chamber 64 above this pressure in passage 84 so that movement of piston 52 is produced at a slightly higher pressure to aid in linearizing the flow to pressure drop relationship in the high flow regime as shown by the graph of FIGURE 2. With flow in the aforementioned direction, from passage 82, feedback means include passages 76 and 88 and chamber 64.

In a like manner, flow from source passage 84 fills up passages 74, 76, bleed passage 88, and chamber 64, and, of course, passage 90, as aforementioned. As pressure increases at source 84, the pressure within chamber 64 increases in a like manner until the pressure is sufficient to overcome the combined force of spring 70 and the pressure in chamber 62 and move piston 52 toward chamber 62 (to the left in FIGURE 3) and thereby open passage 74 to cause flow from source 84 to travel through passage 74 into chamber 55 and out passage 80 and source 82. Flow continues until pressure within chamber 62, caused by flow through passage 86 into chamber 62, increases to the point, wherein its force in combination with the force of spring 70 is sufficient to overcome the forces of the pressure of the fluid within chamber 64 and spring 72 therein to move piston 52 back to its normal position, as shown in FIGURE 3, so that passage 74 is slowly closed in a manner that maintains the linearity between flow and pressure drop through the valve. Restriction 81 acts in the same manner as restriction 77 to cause a slightly higher pressure in section 83 of passage 80, than in the remainder of passage 80 and thus a slightly higher pressure in chamber 62 than exists at source 82 to cause piston 82 to respond in a manner that linearizes the flow to pressure drop relationship at high values thereof through the valve. With flow from source passage 84, the feedback means comprises passages 80 and 86 and chamber 62.

Passage 90, as aforementioned, which is small in cross-sectional area compared to the other passages, permits flow through the valve to occur at all times even though this flow is very slight therethrough because of restriction 92. By permitting this flow, the linear relationship between flow and pressure is thus maintaned at small values of flow and pressure. Restrictors 81, 77, and 92 may alternatively be made variable and thereby can be adjusted to achieve the desired linear relationship of flow to pressure drop.

It is noted that with the valve of FIGURE 3 by the use of the three spools and two inlet passages on each side of the valve (74, 76 and 80, 78) flow in either direction, from passage 82 or 84 passes through only one restriction, either 77 or 81 in passing through the valve. Alternatively, restrictors 77 and 81 can be located between passageways 88 and 86, respectively, to reshape the pressure flow relationships to suit special requirements. This single direction through each of the restrictions 77, 83 allows individual adjustment of the pressure flow relationship for each direction of flow. It is further noted that these restrictions 77 and 81 produce an increased ΔP at high values of flow by chocking the flow to linearize the flow to pressure drop relationship at high values thereof.

A linear relationship is especially significant since any value of pressure has only one value of flow and vice versa. Without this linearity, a specific value of pressure may have many values of flow which correspond thereto and thus precision control cannot be achieved. With my valve, since there is only one value of pressure for any value of flow and vice versa, operation is achieved with the utmost precision. Because a certain value of flow produces only one certain value of pressure and vice versa, stability of any system which the valve controls is thereby easily achieved.

It will be appreciated that the cross-sectional area of the passages and cylinders of my valves are preferably circular (tubular) but may be rectangular or other cross-sectional shape, as desired.

It is noted that many fluids may be effectively employed with my valves, one particularly desirable one being water.

It will also be appreciated that my valve may be employed as a flow meter since, if the pressure drop is known, the flow is quickly determined because of the linear relationship between the two.

It will be apparent from the foregoing that my invention attains the objectives set forth. Apparatus embodying the invention is sturdy in construction and well adapted for use in conjunction with fluid control. Because of the linearity of the flow to pressure drop relationship through the valve, stability control of an interconnected system is achieved.

While specific embodiments of my invention have been illustrated, the invention is not limited thereto since many modifications may be made by one skilled in the art and the appended claims are intended to cover all such modifications as fall within the true spirit and scope of my invention.

What I claim as new and desire to secure by Letters Patent of the United States is:

1. A pressure responsive fluid control valve comprising a main cylinder having a central section and end walls, a piston having spools at the ends thereof, positioned to be movable within said cylinder,
springs in said cylinder positioned between said spools and said end walls to bias the piston to a normal central position within said cylinder,
an inlet passage communicating with the central part of said cylinder proximate said piston for transmitting fluid from a system that is being controlled to said cylinder,
a bleed passage connecting said inlet passage to said main cylinder through the end wall thereof so that fluid is transmitted from said inlet passage to an end of said main cylinder contiguous with one of said spools of said piston to move said piston in response to an increasing pressure from the system being controlled,
an outlet passage communicating with said central section of said main cylinder that is normally closed by said spools of said piston and whereby fluid flows from said inlet passage through said outlet passage when the piston is moved by a pressure signal from the system being controlled,
an output bleed passage connecting said outlet passage and the other end of said main cylinder so that a fluid signal is transmitted from said outlet passage through said bleed passage to said main cylinder to act in unison with said spring to move said piston back to its normal position in a manner which linearizes flow to pressure relationship between said input and output passages, to thereby impart stability to the system being controlled,
means for permitting a small amount of flow to pass from said inlet passage to said outlet passage to thereby insure linearity of the flow to pressure drop relationship at small values thereof.

2. A pressure responsive fluid control valve comprising a main cylinder, having a central section and end walls, a piston having spools at the ends thereof, positioned to be movable within said cylinder,
springs in said cylinder positioned between said spools and said end walls to bias the piston to a normal central position within said cylinder,
an inlet passage communicating with the central part of said cylinder proximate said piston for transmitting fluid from a system that is being controlled to said cylinder,
a bleed passage connecting said inlet passage to said main cylinder through the end wall thereof so that fluid is transmitted from said main passage to an end of said main cylinder contiguous with one of said spools of said piston to move said piston in response to an increasing pressure from the system being controlled,
an outlet passage communicating with said central section of said main cylinder and that is normally closed by said spools of said piston and whereby fluid flows from said inlet passage through said outlet passage when the piston is moved by a pressure signal from the system being controlled,
an output bleed passage connecting said outlet passage and the other end of said main cylinder so that a fluid signal is transmitted from said outlet passage through said bleed passage to said main cylinder to act in unison with said spring to move said piston back to its normal position in a manner which linearizes flow to pressure drop relationship between said input and output passages to thereby impart stability to the system being controlled,
means for permitting a small amount of flow to pass from said inlet passage to said outlet passage to thereby insure linearity of the flow to pressure drop relationship at small values thereof, restriction means in said bleed passages to increase the pressure to one of said end sections of said cylinders when flow is in one direction to thereby slightly increase the pressure at a particular flow so that the flow to pressure relationship at high values thereof is maintained linear.

3. A control valve comprising
a main passage,
a piston having two spools interconnected by a shaft member and movable in said passage,
biasing means between the end walls of said passage and the ends of said piston,
a first passage connecting the outside of said valve to the central part of said main passage only,
a first bleed passage connecting said first passage to one end of said main passage,
a second passage being bifurcated and connecting the outside of said valve with two ports which are normally substantially closed each by one spool of said piston,
a second bleed passage connecting said second passage to the other end of said main passage so that pressure applied in one direction across said valve tends to fully open only one of said ports to allow flow through said valve between said ports and pressure applied in the other direction tends to fully open only the other of said ports to allow flow in the other direction through said valve, said rate of flow being a linear function of the pressure difference across said valve.

4. A control valve comprising
a main passage,
a piston having two spools interconnected by a shaft member and movable in said passage,
spring means between the end walls of said passage and the ends of said piston,
a first passage connecting the outside of said valve to the central part of said main passage only,
a first bleed passage connecting said first passage to one end of said main passage,
a second passage being bifurcated and connecting the outside of said valve with two round ports which are normally substantially closed each by one spool of said piston,
a second bleed passage connecting said second passage to the other end of said main passage so that pressure applied in one direction across said valve tends to fully open only one of said ports to allow flow through said valve between said ports and pressure applied in the other direction tends to fully open only the other of said ports to allow flow in the other direction through said valve, said rate of flow being a linear function of the pressure difference across said valve.

5. A pressure control valve for stabilizing a fluid system comprising
a main passage,
a piston having two spools interconnected by a shaft member and movable in said passage,
spring means between the end walls of said passage and the ends of said piston,
a first passage connecting the outside of said valve to the central part of said main passage only,
a first bleed passage connecting said first passage to one end of said main passage,
a second passage being bifurcated and connecting the outside of said valve with two round ports which are normally substantially closed each by one spool of said piston,
a second bleed passage connecting said second passage to the other end of said main passage so that pressure applied in one direction across said valve tends to fully open only one of said ports to allow flow through said valve between said ports and pressure applied in the other direction tends to fully open only the other of said ports to allow flow in the other direction through said valve, said rate of flow being a linear function of the pressure difference across said valve.

References Cited
UNITED STATES PATENTS

| | | | |
|---|---|---|---|
| 2,990,847 | 7/1961 | Absalom | 137—501 X |
| 3,176,591 | 4/1965 | Howland | 251—29 X |

M. CARY NELSON, *Primary Examiner.*

R. J. MILLER, *Assistant Examiner.*